US011935511B2

(12) United States Patent
Yamaguchi

(10) Patent No.: US 11,935,511 B2
(45) Date of Patent: Mar. 19, 2024

(54) ACOUSTIC OUTPUT APPARATUS

(71) Applicant: TOSHIBA TEC KABUSHIKI KAISHA, Tokyo (JP)

(72) Inventor: Masao Yamaguchi, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 384 days.

(21) Appl. No.: 17/338,745

(22) Filed: Jun. 4, 2021

(65) Prior Publication Data

US 2022/0208166 A1 Jun. 30, 2022

(30) Foreign Application Priority Data

Dec. 24, 2020 (JP) ................................ 2020-214922

(51) Int. Cl.
*G10K 11/178* (2006.01)

(52) U.S. Cl.
CPC .. *G10K 11/17823* (2018.01); *G10K 11/17881* (2018.01); *G10K 2210/1052* (2013.01)

(58) Field of Classification Search
CPC ....... G10K 11/17823; G10K 11/17881; G10K 2210/1052
See application file for complete search history.

(56) References Cited

FOREIGN PATENT DOCUMENTS

JP 2014102360 A * 6/2014
JP 2014-206609 10/2014

* cited by examiner

*Primary Examiner* — David L Ton
(74) *Attorney, Agent, or Firm* — Amin, Turocy & Watson, LLP

(57) ABSTRACT

According to an embodiment, an acoustic output apparatus includes an acquisition unit and an output unit. The acquisition unit acquires non-stationary sound data that masks an operating sound, in which the operating sound is based on an operation of the operation unit. The output unit outputs a non-stationary sound based on the sound data acquired by the acquisition unit during occurrence of the operating sound.

17 Claims, 8 Drawing Sheets

ACOUSTIC OUTPUT APPARATUS

CROSS-REFERENCE TO RELATED APPLICATION

This application is based upon and claims the benefit of priority from Japanese Patent Application No. 2020-214922, filed on Dec. 24, 2020 the entire contents of which are incorporated herein by reference.

FIELD

Exemplary embodiments described herein relate to an acoustic output apparatus, an acoustic output method, and an image forming apparatus.

BACKGROUND

Image forming apparatuses such as multifunction peripherals (MFPs) include many sound sources that emit operating sounds. Since the operating sound includes a large amount of stationary sounds and transient sounds such as impacts or the like, the sound includes sounds of various frequency characteristics. The operating sound is an unpleasant sound for people around the image forming apparatus.

The image forming apparatus can be equipped with optional devices such as an automatic document feeder, a finisher, and a multi-stage paper feed device as well as the main body. In such a case, the image forming apparatus may emit a greater amount of unpleasant sounds.

As a way of dealing with the operating sound, it is conceivable that a sound absorbing material is provided in the image forming apparatus. However, the sound absorbing material does not have a sound absorbing effect over a wide range of frequencies, due to, for example, a peak of the sound-absorbing rate at about 2000 Hz, and so on. Accordingly, the sound absorbing material is less effective in reducing the operating sound of the image forming apparatus. As another way, it is conceivable to output white noise or pink noise to mask the operating sound from a speaker to make the operating sound inaudible. However, since both white noise and pink noise include high-frequency sounds, such sounds are also unpleasant sounds.

DETAILED DESCRIPTION

Figure 1:
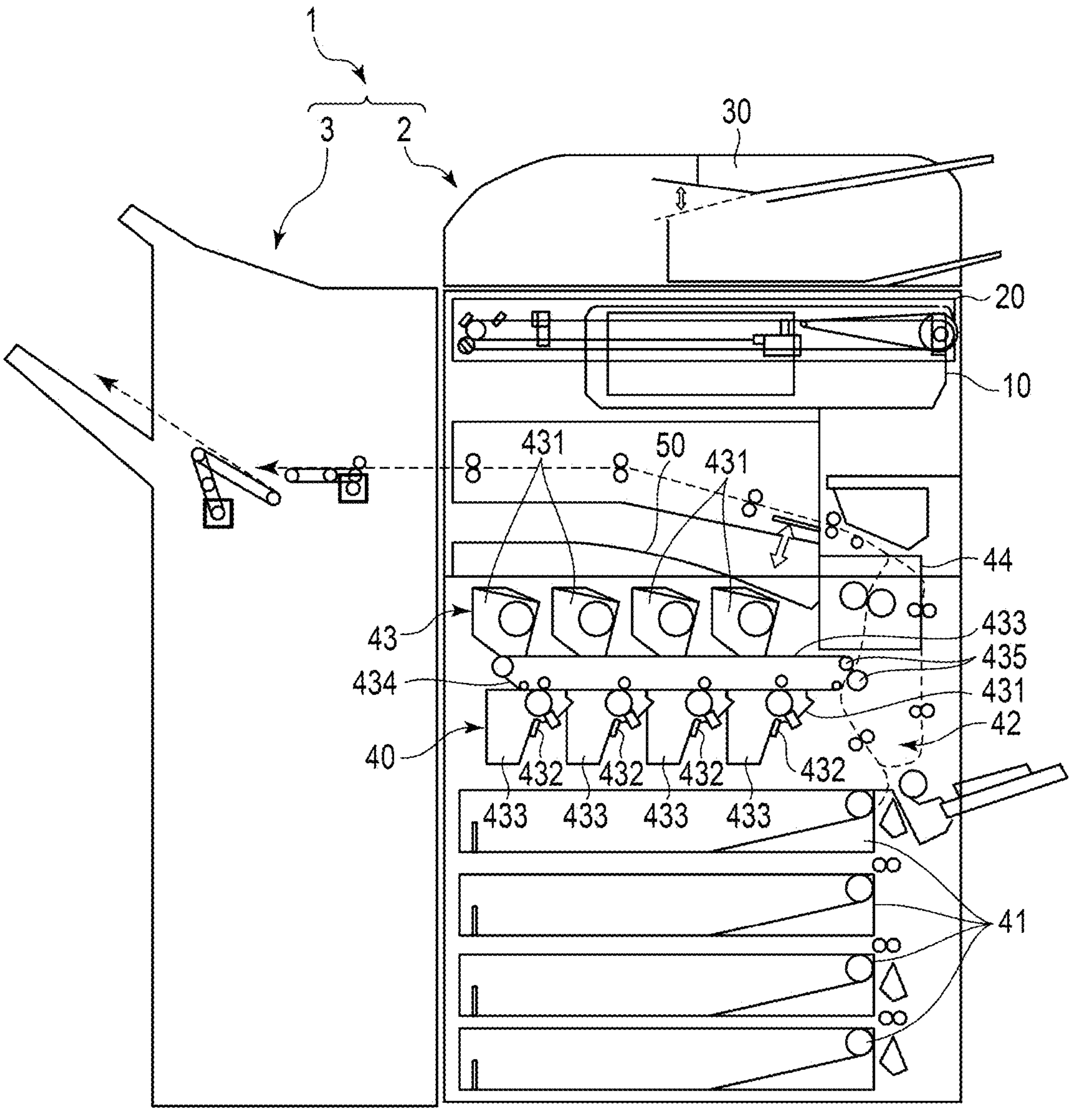
FIG. 1 is a diagram illustrating an outline of a configuration example of an image forming apparatus according to an embodiment.

Embodiments provide a technique for making an operating sound of an operation unit inconspicuous.

According to an embodiment, an acoustic output apparatus includes an acquisition unit and an output unit. The acquisition unit acquires non-stationary sound data that masks an operating sound, in which the operating sound is based on the operation of an operation unit. The output unit outputs the non-stationary sound based on the sound data acquired by the acquisition unit during the occurrence of the operating sound. According to another embodiment, an acoustic output method involves acquiring sound data of a non-stationary sound that masks an operating sound, in which the operating sound is based on an operation of an operation component; and an output component that outputting the non-stationary sound based on the sound data acquired during an occurrence of the operating sound.

Hereinafter, embodiments will be described with reference to the drawings. Note that, in the drawings used for the explanation of the following embodiments, the scale of each part may be changed as appropriate. In the drawings used for the explanation of the following embodiments, certain configuration may be omitted for the sake of explanation.

FIG. 1 is a diagram illustrating an outline of a configuration example of an image forming apparatus 1. The image forming apparatus 1 will be described with reference to a digital multifunction peripheral (MFP) having an electrophotographic printing function. The image forming apparatus 1 is also an example of an acoustic output apparatus that outputs sound. The sound includes voice.

The image forming apparatus 1 includes an apparatus main body 2 and a finisher 3. In the present example, the image forming apparatus 1 is described as including the finisher 3, but the image forming apparatus 1 may not include the finisher 3.

The apparatus main body 2 is a device that includes components for realizing the printing function and the like described above. The finisher 3 is an apparatus that performs post-processing such as processing a medium introduced from the apparatus main body 2. For example, the post-processing is various processing such assorting, stapling, hole punching, center-folding, center-binding, and the like. The medium is paper or the like. The finisher 3 is detachable from the apparatus main body 2. For example, the finisher 3 is an inner finisher or a saddle finisher.

The apparatus main body 2 includes a control panel 10, a scanner unit 20, an automatic document feeder 30, a printer unit 40, and a paper discharge tray 50.

The control panel 10 includes a display device that displays various screens. The control panel 10 includes an input device that inputs an instruction based on user's operation.

The scanner unit 20 is a device that reads an image from a medium such as a document or the like. The scanner unit 20 includes a line sensor. The line sensor may adopt a charge coupled device (CCD) method. The line sensor may adopt a contact image sensor (CIS) method. The line sensor may adopt a method other than the above. The scanner unit 20 generates image data based on the image read by using the line sensor.

The automatic document feeder 30 is a device that conveys a medium such as a document or the like to a reading position of the scanner unit 20. The automatic document feeder 30 includes a tray on which the medium is placed. The automatic document feeder 30 conveys the medium placed on the tray to the reading position of the scanner unit 20 one after another.

The printer unit 40 is a device that forms an image on the medium by fixing a toner image transferred onto the medium. The printer unit 40 may form the image on the medium based on the image data generated by the scanner unit 20. The printer unit 40 may form the image on the medium based on the image data received by the image forming apparatus 1 from another apparatus.

The paper discharge tray 50 is a tray on which the medium discharged from the printer unit 40 and having the image formed thereon by the printer unit 40 is placed.

The printer unit 40 includes an accommodation unit 41, a convey unit 42, an image forming unit 43, and a fixing unit 44.

The accommodation unit 41 is a component that accommodates the medium. The accommodation unit 41 includes a plurality of paper feed cassettes. Each paper cassette accommodates media of a predetermined size and type. Each paper cassette includes a pickup roller. The pickup roller picks up the media one by one from the paper cassette. The pickup roller feeds the picked medium to the convey unit 42.

The convey unit 42 includes a plurality of rollers, a plurality of convey guides, and the like for conveying the medium in the apparatus main body 2. The convey unit 42 conveys the medium fed from the accommodation unit 41 to the image forming unit 43 and the fixing unit 44 in this order. The convey unit 42 conveys the medium with the image formed thereon, which has passed through the fixing unit 44, to the paper discharge tray 50 or the finisher 3.

The image forming unit 43 is a component that forms a toner image on the medium. The image forming unit 43 includes a plurality of toner cartridges 431, a plurality of developing units 432, a plurality of exposure devices 433, an intermediate transfer belt 434, and a transfer unit 435.

Each of the plurality of toner cartridges 431 is a component that stores toner. The plurality of toner cartridges 431 are a plurality of toner cartridges that store toners of respective colors. The plurality of toner cartridges 431 include a cyan toner cartridge, a magenta toner cartridge, a yellow toner cartridge, and a black toner cartridge. The plurality of toner cartridges 431 may include a toner cartridge of decolorizing toner that is decolorized at a temperature higher than a predetermined temperature. Each toner cartridge 431 supplies toner to each developing unit 432. If the image forming apparatus 1 is such an apparatus that forms an image on a medium in a single color, the image forming unit 43 is configured to include one toner cartridge 431 rather than a plurality of toner cartridges 431.

Each of the plurality of developing units 432 is a component that multiple-transfers a toner image of each color on a surface of the intermediate transfer belt 434. The plurality of developing units 432 are a plurality of developing units corresponding to the toners of respective colors. The plurality of developing units 432 include a cyan developing unit, a magenta developing unit, a yellow developing unit, and a black developing unit. The plurality of developing units 432 may include a developing unit for decolorizing toner. If the image forming apparatus 1 is such an apparatus that forms an image on a medium in a single color, the image forming unit 43 is configured to include one developing unit 432 rather than a plurality of developing units 432.

Each of the developing units 432 includes a photoconductor drum. Each of the developing units 432 includes a charger, a developing apparatus, a primary transfer roller, a cleaning unit, a static eliminator, and the like around the photoconductor drum.

The photoconductor drum is an image carrier having a photoconductor layer on its surface. The photoconductor drum is rotated about the axis.

The charger uniformly charges the photoconductor layer on the surface of the photoconductor drum. For example, the charger charges the surface of the photoconductor drum negatively.

The developing apparatus develops an electrostatic latent image on the surface of the photoconductor drum using the toner supplied from the toner cartridge 431. That is, the developing apparatus attaches the toner to the electrostatic latent image of the photoconductor drum and forms the toner image on the surface of the photoconductor drum.

The primary transfer roller is positioned to face the photoconductor drum, while the intermediate transfer belt 434 is interposed therebetween. The primary transfer roller transfers the toner image on the surface of the photoconductor drum onto a surface of the intermediate transfer belt 434. The transfer of the toner image from the photoconductor drum onto the intermediate transfer belt 434 by the primary transfer roller is also referred to as a primary transfer.

The cleaning unit is at a rear stage of a position where the toner image on the surface of the photoconductor drum is transferred onto the surface of the intermediate transfer belt 434. The cleaning unit scrapes off and removes toner and the like that is not transferred onto the intermediate transfer belt 434 from the surface of the photoconductor drum.

The static eliminator is positioned to face the photoconductor drum that passed through the cleaning unit. The static eliminator irradiates the surface of the photoconductor drum with light to remove static electricity from the photoconductor layer of the photoconductor drum. The charge of the photoconductor layer of the photoconductor drum is uniformized.

Each of the plurality of exposure devices 433 is a component that forms an electrostatic latent image on the surface of the photoconductor drum of each of the developing units 432. Each of the exposure devices 433 is positioned to face each of the developing units 432. Each of the exposure devices 433 includes a semiconductor laser light source. Each of the exposure devices 433 irradiates the surface of the photoconductor drum of each of the developing units 432 with a laser beam via an optical system such as a polygon mirror, or the like. Each of the exposure devices 433 forms an electrostatic pattern as an electrostatic latent image at a position on the surface of the photoconductor drum irradiated with the laser beam. Each of the exposure devices 433 may include a light emitting diode (LED) instead of the laser light source. If the image forming apparatus 1 is such an apparatus that forms an image on a medium in a single color, the image forming unit 43 is configured to include one exposure device 433 rather than a plurality of exposure devices 433.

The intermediate transfer belt 434 is an endless belt. The intermediate transfer belt 434 is rotatable by the movement of the rollers. The intermediate transfer belt 434 is passed between the photoconductor drum of each developing unit 432 and the primary transfer roller.

The transfer unit 435 is a component that transfers a charged toner image on the surface of the intermediate transfer belt 434 onto the medium. The transfer of the toner image from the intermediate transfer belt 434 to the medium by the transfer unit 435 is also referred to as a secondary transfer. The transfer unit 435 includes support rollers and secondary transfer rollers that face each other. The support roller and the secondary transfer roller are configured to hold the intermediate transfer belt 434 and the medium therebetween from both sides in the thickness direction. The support roller also serves as a roller that drives the intermediate transfer belt 434.

The fixing unit 44 is configured to fix the toner image on the medium by heating and pressing the medium that has the toner image transferred thereon. The fixing unit 44 includes a heating roller and a pressing roller facing each other. The heating roller is a roller that includes a heat source. For example, the heat source is a heater. The heating roller heats the medium that has the toner image transferred thereon. The pressing roller presses the medium having the toner image transferred thereon and passed between the pressing roller and the heating roller.

Figure 2:
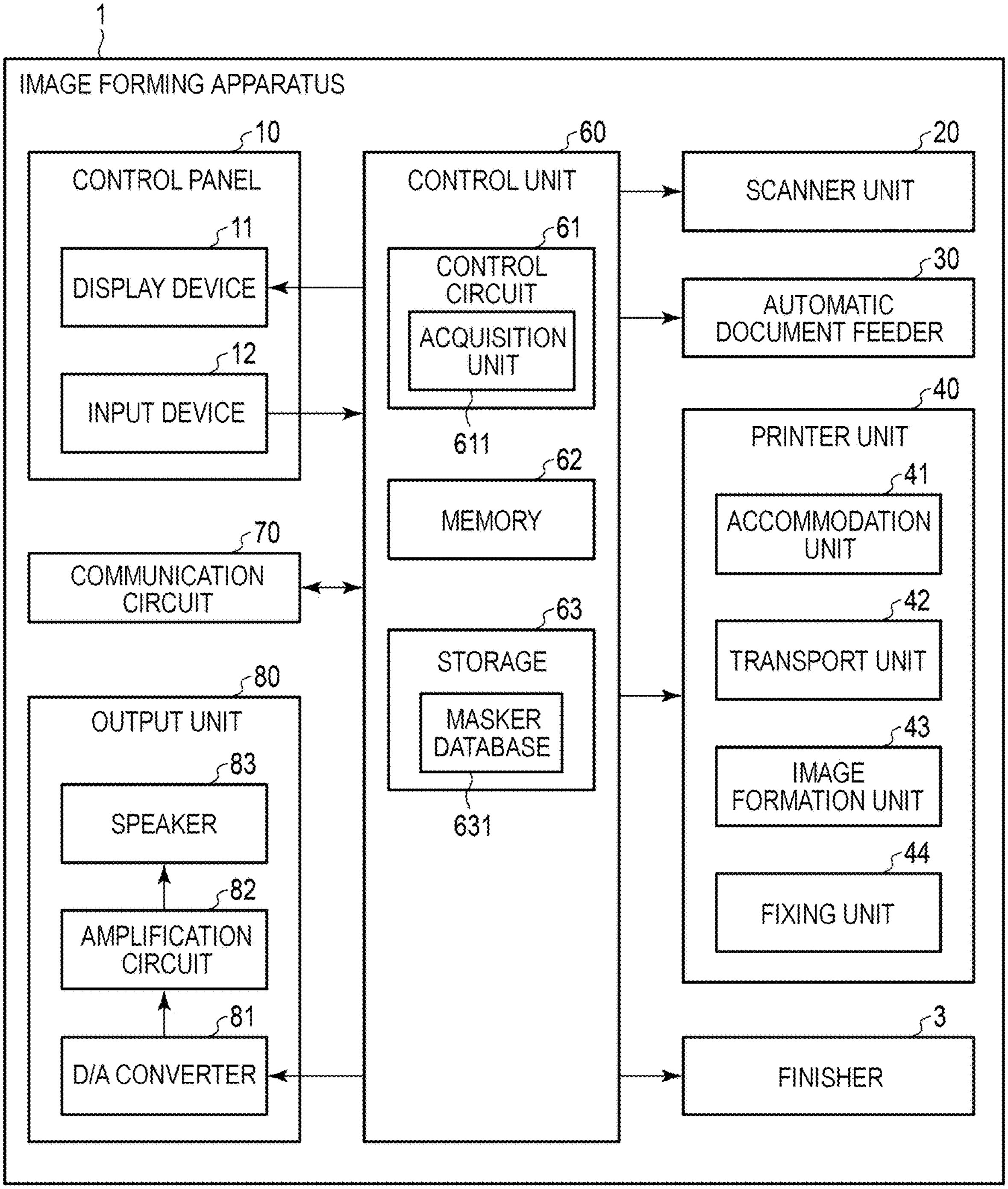
FIG. 2 is a block diagram illustrating an outline of a configuration example of an image forming apparatus.

FIG. 2 is a block diagram schematically illustrating an exemplary configuration of the image forming apparatus 1. The image forming apparatus 1 includes a control unit 60, a communication circuit 70, and an output unit 80 in addition to the finisher 3, the control panel 10, the scanner unit 20, the automatic document feeder 30, and the printer unit 40 described above.

The control panel 10 includes a display device 11 and an input device 12. The display device 11 is a liquid crystal display, an organic electroluminescence (EL) display, or the like. The display device 11 is an example of a display unit. The input device 12 is a touch panel, buttons, and the like. The input device 12 is an example of an input unit.

The control unit 60 forms a computer that controls the operation of each part of the image forming apparatus 1. The control unit 60 includes a control circuit 61, a memory 62, and a storage 63.

The control circuit 61 corresponds to the central part of the computer. For example, the control circuit 61 is a circuit that includes a processor such as a central processing unit (CPU). The control circuit 61 may include application specific integrated circuit (ASIC), field programmable gate array (FPGA), graphics processing unit (GPU), or the like in addition to or in place of the CPU. The control circuit 61 loads the program stored in the storage 63 or the like into the memory 62. The control circuit 61 executes various operations by executing the program loaded in the memory 62. The program is a program that realizes each part in the control circuit 61 that will be described below.

The memory 62 includes a read only memory (ROM) and a random access memory (RAM). The ROM corresponds to the main storage device of the computer centered on the control circuit 61. The ROM is a non-volatile memory. The ROM stores data or various set values used by the control circuit 61 to perform various processes. The RAM corresponds to the main storage device of the computer centered on the control circuit 61. The RAM is a memory used for reading and writing data. The RAM is a so-called work area that stores data temporarily used by the control circuit 61 to perform various processes.

The storage 63 corresponds to an auxiliary storage device of the computer centered on the control circuit 61. For example, the storage 63 is an electric erasable programmable read-only memory (EEPROM) (registered trademark), a hard disk drive (HDD), a solid state drive (SSD), or the like. The storage 63 stores the program described above. The storage 63 stores data used by the control circuit 61 to perform various processes. The storage 63 is an example of a storage unit.

The storage 63 stores a masker database 631. The masker database 631 is a database that stores a plurality of masker data associated with a plurality of operation modes on a one-to-one basis. In the present example, an example in which the storage 63 stores a plurality of masker data in the masker database 631 is described, but the storage format is not limited to the masker database 631.

The masker data is the sound data of a masker. The masker refers to a non-stationary sound that masks the operating sound, in which the operating sound is based on the operation of the operation unit. The masker is a sound different from the operating sound. Unlike a stationary sound, the non-stationary sound is a sound with a sound pressure level that is non-constant with the passage of time. The stationary sound is a sound with a sound pressure level that is constant or substantially constant with the passage of time.

The masker includes stationary and transient sounds. It is illustrated that the masker includes a natural sound as the stationary sound, but the stationary sound included in the masker is not limited to the natural sound. The transient sound is a sound with a sound pressure level that changes with the passage of time. Since the masker includes not only the stationary sound but also the transient sound, the masker may be regarded as the non-stationary sound. The frequency characteristics of the masker will be described below.

The operation mode is a mode for the operation of the image forming apparatus 1 that emits an operating sound from the operation of the operation unit of the image forming apparatus 1. For example, the operation mode is a mode for the printing operation of the image forming apparatus 1. In the present example, the operation mode is determined by various conditions such as the number of sheets per part, the number of copies, the presence of post-processing such as staples, and the like.

The operation unit includes various components that are operated by electric power among the components forming the image forming apparatus 1. For example, the operation unit is a part or all of the finisher 3, the scanner unit 20, the automatic document feeder 30, and the printer unit 40 described above, but is not limited thereto.

Masking involves audibly diverting consciousness into the masker and making the operating sound inconspicuous. Masking the operating sound inconspicuous includes reducing the discomfort from the operating sound.

The operating sound is a sound that occurs based on the operation of the operation unit. The operating sound includes sounds with various frequency characteristics. For example, the operating sound includes the stationary sound and the transient sound. The sound source of the stationary sound is the motor, the fan, and the like provided in the operation unit described above, but is not limited thereto. The stationary sound occurs based on the operation of the motor, the fan, and the like.

The transient sound is a sound produced by a contact or the like between two or more different components according to the operation of the operation unit, and is a collision sound, a rubbing sound, or the like, for example. For example, the sound source of the collision sound is a collision between the medium being conveyed and the roller, and post-processing by the finisher 3 on the medium. The sound source of the rubbing sound is the contact between the medium being conveyed and the convey guide, and the like. Since the impact sound is a sound that is temporarily occurred, the sound is an example of the transient sound, and since the operating sound includes not only the stationary sound but also the impact sound, the operating sound may be regarded as the non-stationary sound. The operating sound in the present disclosure is a masking target that is masked by the masker.

The operating sound differs according to the operation mode. Therefore, the number of times of occurrence of the impact sounds included in a period from a beginning to an end of the occurrence of the operating sound is predetermined for each operation mode based on the configuration of the operation unit, but the number of times differs for each operation mode. The timing of occurrence of the impact sound included in the period from the beginning to the end of the occurrence of the operating sound is predetermined for each operation mode based on a known value such as the printing speed, but the timing of occurrence differs for each operation mode.

Since the operating sound has the characteristics described above, each masker data is different from the other according to the operation mode associated with each masker data. If the operating sound based on a certain operation mode includes the operating sounds for a plurality of cycles repeating at a certain cycle, the masker data associated with the certain operation mode may be the data corresponding to the operating sound for one cycle. For example, if the operation mode is a continuous print mode, the operating sound based on the operation mode includes the operating sound from a plurality of cycles repeating at a certain cycle. The cycle corresponds to the length of time. Meanwhile, the masker data may be data corresponding to the operating sound from a plurality of cycles.

The communication circuit 70 is an interface that enables the image forming apparatus 1 to communicate with another apparatus via a network.

The output unit 80 is a device that outputs sound. The output unit 80 includes a digital to analog converter (D/A converter) 81, an amplifier circuit 82, and a speaker 83.

The D/A converter 81 is a circuit that converts a digital signal into an analog signal. For example, the D/A converter 81 converts the masker data of the digital signal acquired by the control circuit 61 into an analog signal.

The amplifier circuit 82 is an amplifier that amplifies the analog signal converted by the D/A converter 81. For example, the amplifier circuit 82 amplifies the analog signal of the masker data converted by the D/A converter 81.

The speaker 83 outputs a sound based on the analog signal amplified by the amplifier circuit 82. For example, the speaker 83 outputs a sound based on the analog signal of the masker data amplified by the amplifier circuit 82. Ina typical example, the speaker 83 outputs a non-stationary sound based on the masker data acquired by the control circuit 61 during the occurrence of the operating sound. By “during the occurrence of the operating sound”, it corresponds to the period from the beginning to the end of the occurrence of the operating sound.

The speaker 83 may be installed inside an exterior cover on a front surface of the apparatus main body 2 and in an opening provided in the exterior cover. The speaker 83 may be installed in the finisher 3 which is likely to produce a large amount of impact sounds. The speaker 83 is an example of the output unit that outputs sound by applying air vibration. In addition to the speaker 83, the output unit may be a component that can generate vibration, such as the exterior cover, the parts, the control panel, and the like of the image forming apparatus 1.

Each part realized in the control circuit 61 described above will be described. The control circuit 61 implements the acquisition unit 611. Each part implemented in the control circuit 61 may be regarded as each function.

The acquisition unit 611 acquires the masker data. For example, the acquisition unit 611 acquires the masker data corresponding to operation instruction from the masker database 631 based on the operation instruction input through the input device 12 by the user’s operation. The operation instruction includes a designation instruction and an operation start instruction. The designation instruction is an instruction to designate the operation mode. The operation start instruction is an instruction to start the operation of the image forming apparatus 1 based on the operation mode indicated by the designation instruction. The masker data corresponding to the operation instruction is the masker data corresponding to the operation mode indicated by the designation instruction included in the operation instruction. For example, the masker data corresponding to the operation mode indicated by the designation instruction is the masker data having the same or substantially the same time interval as the time interval from the beginning to the end of the occurrence of the operating sound that occurs in the operation mode indicated by the designation instruction. The operating sound that occurs in the operation mode indicated by the designation instruction is also referred to as the operating sound based on the operation mode.

If the operating sound based on the operation mode includes the operating sound for a plurality of cycles repeating at a certain cycle, the acquisition unit 611 may acquire the masker data corresponding to the operation mode indicated by the designation instruction as follows. For example, the acquisition unit 611 acquires the masker data corresponding to the operating sound for one cycle, which is associated with the operation mode indicated by the designation instruction, from the masker database 631. The acquisition unit 611 generates masker data corresponding to the operating sounds for a plurality of cycles based on the acquired masker data, and acquires the masker data corresponding to the operation mode indicated by the designation instruction. Meanwhile, for example, the acquisition unit 611 acquires the masker data corresponding to the operating sound for a plurality of cycles which are repetitions of one cycle in association with the operation mode indicated by the designation instruction, from the masker database 631.

Figure 3:
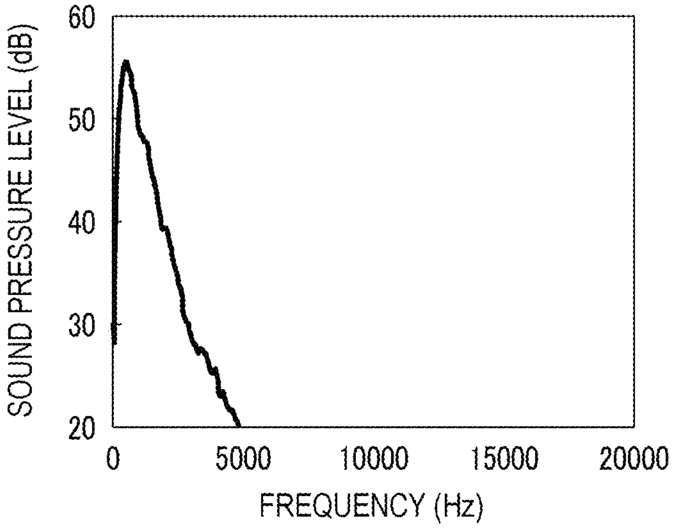
FIG. 3 is a diagram illustrating frequency characteristics of natural sounds included in a masker.

The frequency characteristics of the natural sound included in the masker will be described. FIG. 3 is a diagram illustrating the frequency characteristic of the natural sound included in the masker. FIG. 3 illustrates the sound pressure level of each frequency component included in the natural sound. The horizontal axis denotes the frequency, and the vertical axis denotes the sound pressure level. The frequency characteristic of the natural sound illustrated in FIG. 3 is the frequency characteristic of the babbling of a stream, but the natural sound is not limited to the babbling of a stream. For example, the babbling of a stream includes a large amount of low frequency components of 2 kHz or less.

While the stationary sound included in the operating sound includes a large amount of low frequency components such as a large amount of motor driving sounds, fan sounds, and the like, the natural sound masks the low frequency components of the operating sound. The natural sound has a low ratio of high frequency components, which does not cause discomfort. Being a familiar sound, the natural sound does not cause discomfort. The natural sound has the effect of healing minds.

Figure 4:
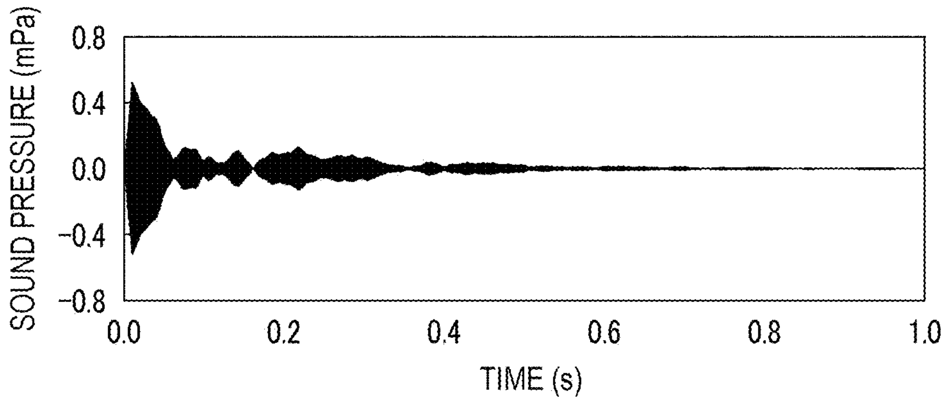
FIG. 4 is a diagram illustrating acoustic characteristics of transient sounds included in the masker.

The acoustic characteristic of the transient sound included in the masker will be described. FIG. 4 is a diagram illustrating the acoustic characteristic of the transient sound included in the masker. FIG. 4 illustrates a change in sound pressure of transient sound with time change. The horizontal axis denotes time and the vertical axis denotes sound pressure.

Figure 5:
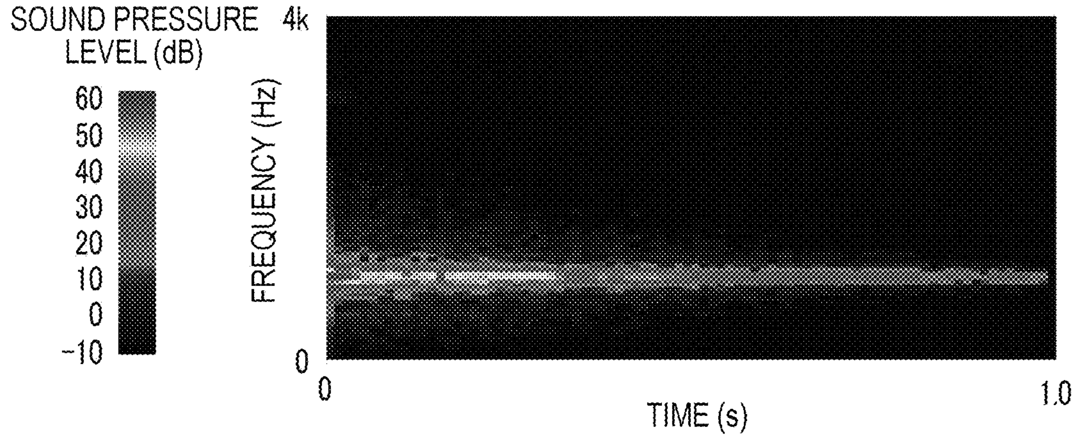
FIG. 5 is a diagram illustrating acoustic characteristics of the transient sounds included in the masker.

FIG. 5 is a diagram illustrating the acoustic characteristic of the transient sound included in the masker. FIG. 5 illustrates the sound pressure level of each frequency component included in the transient sound according to time change of the transient sound. The horizontal axis denotes time and the vertical axis denotes frequency.

For example, the transient sound includes a reverberation sound centered on a 1 KHz frequency. The transient sound is preferably at a low frequency. The length of the reverberation sound of the transient sound is preferably 0.2 seconds or more. In the audibility evaluation, since the length of the reverberation sound of the transient sound is 0.2 seconds or longer, as a result, the transient sound is more comfortable to hear.

The acoustic characteristics of the masker will be described. The masker includes the natural sound and the transient sound described above.

Figure 6:
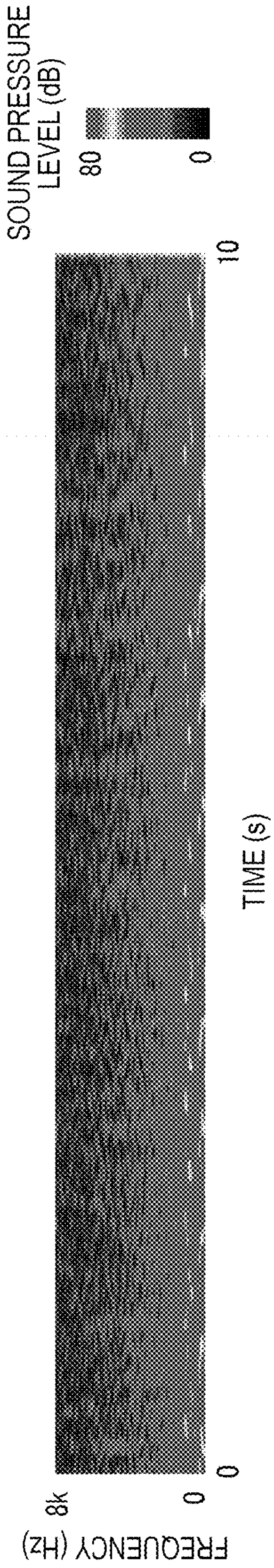
FIG. 6 is a diagram illustrating frequency characteristics of the masker.

FIG. 6 is a diagram illustrating the frequency characteristic of the masker during continuous printing. In FIG. 6, the horizontal axis denotes time and the vertical axis denotes frequency. The vertical axis indicates a range of 0 kHz to 8 kHz.

Figure 7:
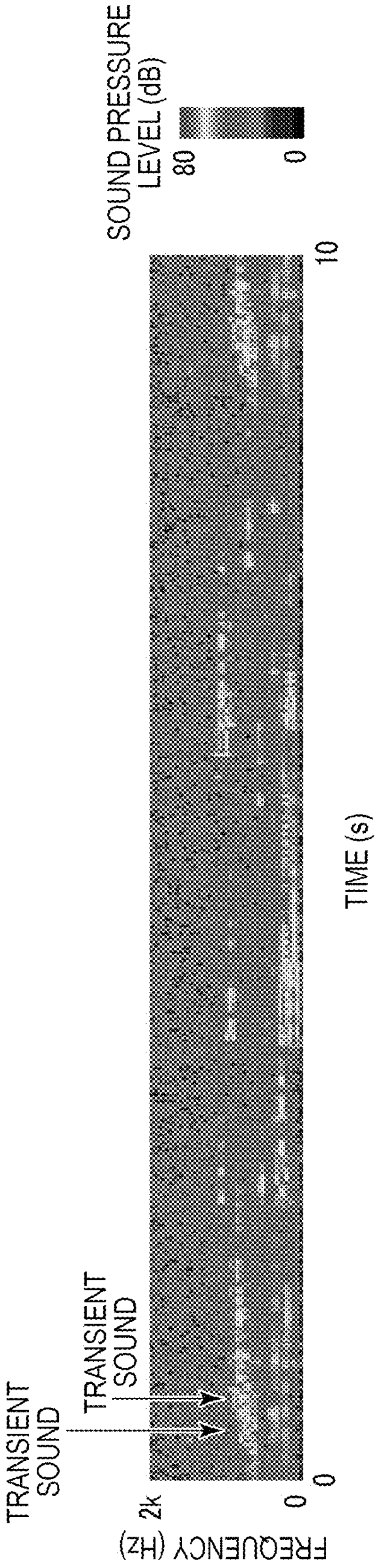
FIG. 7 is a diagram illustrating frequency characteristics of the masker.

FIG. 7 is a diagram illustrating the frequency characteristic of the masker during continuous printing, and is a diagram illustrating the range of 0 kHz to 2 kHz on the vertical axis extracted from FIG. 6.

FIGS. 6 and 7 illustrate the acoustic characteristic of the operating sound for 10 seconds taken from the continuous printing. The speaker 83 outputs a masker based on the masker data acquired by the acquisition unit 611 during the occurrence of the operating sound. The speaker 83 outputs the stationary sound included in the masker. The speaker 83 outputs the transient sound included in the masker.

The masker includes, as the stationary sound, the natural sound including a large amount of low frequency components of 2 kHz or less as described above. Therefore, the sound pressure level of the low frequency component of 2 kHz or less is large at all times.

The masker includes the transient sound that is output at a plurality of timings. For example, as described above, since the transient sound includes the reverberation sound centered on a 1 KHz frequency, as can be seen from FIG. 7, the sound pressure level near 1 KHz temporarily increases at the output timing of the transient sound. The masker is not limited to including the transient sound output at a plurality of timings, and may include the transient sound output at one timing. The output timing of the transient sound after the start of output of the masker is predetermined in the masker data for each operation mode.

The sound pressure level of the masker may be determined in advance, or may differ according to the operation mode.

Figure 8:
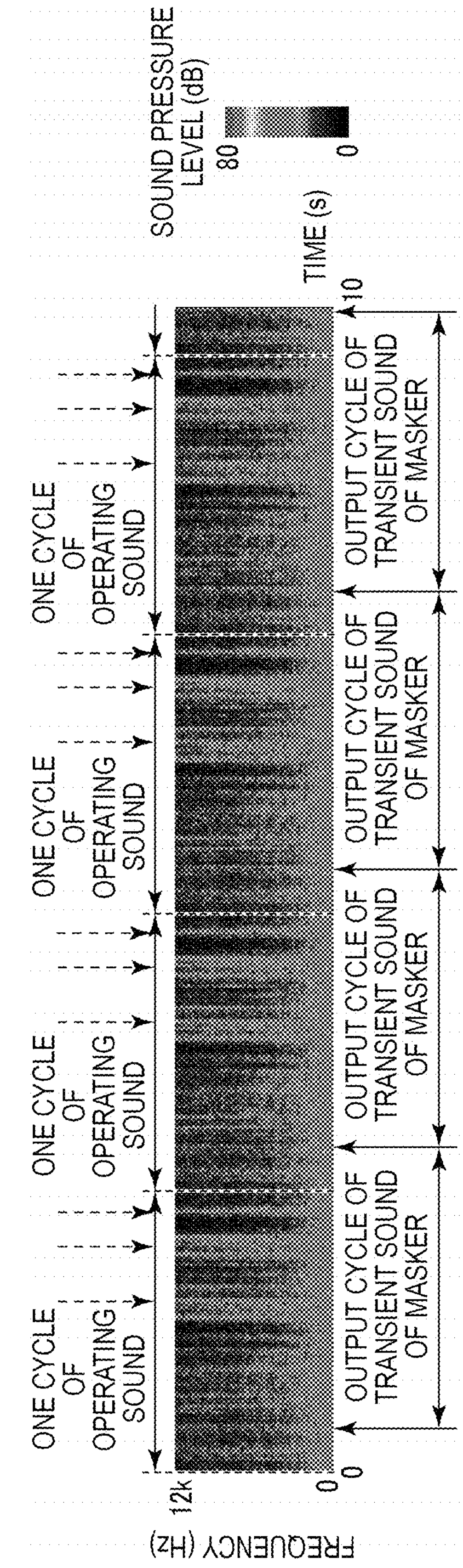
FIG. 8 is a diagram illustrating an example of output timing of the transient sounds included in the masker.

The transient sound included in the masker will be described. FIG. 8 is a diagram illustrating an example of the output timing of the transient sound included in the masker. FIG. 8 illustrates the sound pressure level of each frequency component included in the operating sound according to time change of the operating sound. The horizontal axis denotes time and the vertical axis denotes frequency. The dash line arrow indicates the timing of occurrence of the impact sound included in the operating sound. The vertical stripes correspond to the timing of occurrence of the impact sound. The solid one-sided arrow indicates the output timing of the transient sound included in the masker.

The operating sound illustrated in FIG. 8 illustrates the acoustic characteristic of the operating sound for 10 seconds taken from the continuous printing. The operating sound based on the operation mode is a periodic sound that is repeated at a certain cycle. The operating sound of one cycle includes three impact sounds. The timing of occurrence of the impact sound included in each cycle is the same in any of the cycles.

The speaker 83 outputs the masker based on the masker data acquired by the acquisition unit 611 during the occurrence of the operating sound based on the operation mode. The speaker 83 starts the output of the masker according to the timing of occurrence of the operating sound based on the operation mode, based on the control by the control circuit 61. For example, the speaker 83 may start the output of the masker by using, as a trigger, a detection of the operation start of the image forming apparatus 1, such as a detection of paper convey by the sensor. For example, the speaker 83 may start the output of the masker by using as a trigger the detection of the input of the operation instruction in the input device 12. As a result, the speaker 83 can start the output of the masker according to the timing of occurrence of the operating sound based on the operation mode. The speaker 83 can continuously output the masker during the occurrence of the operating sound based on the operation mode. The speaker 83 can end the output of the masker according to an end timing of the operating sound based on the operation mode.

The output timing of the transient sound may be different from the timing of occurrence of the impact sound included in the operating sound. In the example illustrated in FIG. 8, the speaker 83 outputs the transient sound before the timing of occurrence of the impact sound included in the operating sound. The number of times of output of the transient sound may be less than the number of times of occurrence of the impact sound, or may be equal to or greater than the number of times of occurrence of the impact sound. Since the timing of occurrence of the impact sound that occurs after the timing of the trigger that starts the output of the masker is determined in advance for each operation mode based on the known values such as the printing speed or the like, the output timing of the transient sound after the timing of starting the output of the masker is determined in advance.

The transient sound can divert a person's consciousness to the transient sound, making the impact sound inconspicuous and reducing the discomfort from the impact sound. Since the output timing of the transient sound is earlier than the timing of occurrence of the impact sound, the transient sound can further divert the person's consciousness to the transient sound.

The masker may include the transient sound having the same cycle as the repeating cycle of the operating sound. The repeating cycle of the operating sound corresponds to one cycle of the operating sound that is repeating at a certain cycle included in the operating sound based on the operation mode. For example, the masker includes the transient sound output with a cycle having the same length as the repeating cycle of the operating sound. In the example illustrated in FIG. 8, the speaker 83 outputs the transient sound in a cycle having the same length as the repeating cycle of the operating sound during the occurrence of the operating sound. The speaker 83 outputs the transient sound once in one cycle. Since the output cycle of the transient sound is the same as the repeating cycle of the operating sound, the person's consciousness is likely to be diverted to the transient sound.

If the masker includes a plurality of transient sounds output at a plurality of timings, some or all of the plurality of transient sounds may have different scales. The scale corresponds to the high and low frequencies. In the example illustrated in FIG. 8, the speaker 83 may output all the transient sounds to be output indifferent scales. The speaker 83 may output a part of the transient sounds to be output in a scale different from the other transient sounds. Among the transient sounds to be output, the speaker 83 may output the transient sounds of adjacent output timings in a different scale. Since a plurality of transient sounds have different scales, the transient sounds are not monotonic, and the person's consciousness is likely to be diverted to the transient sounds.

Figure 9:
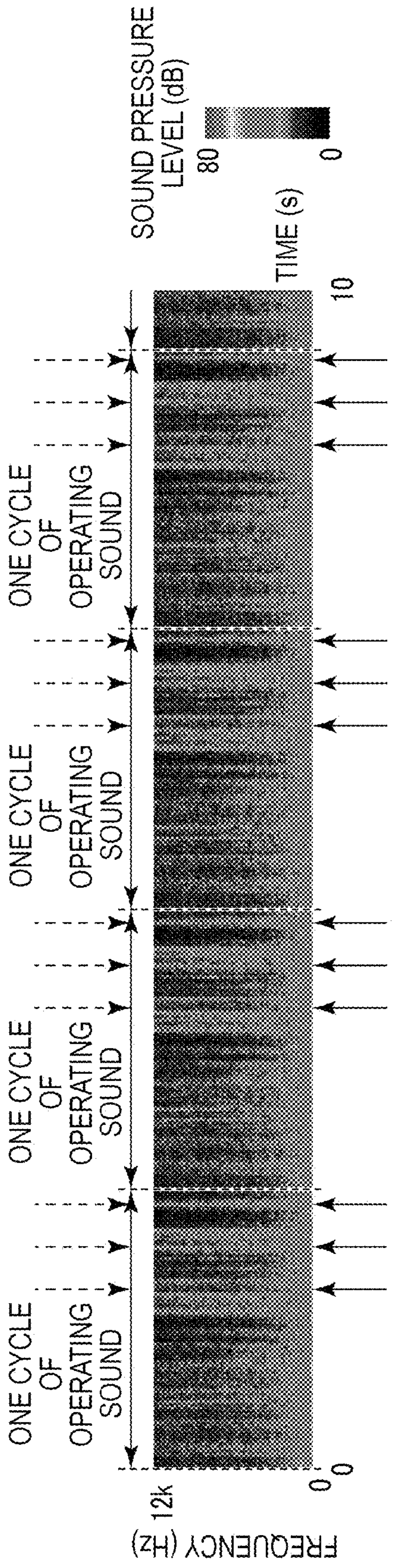
FIG. 9 is a diagram illustrating another example of the output timing of the transient sounds included in the masker.

FIG. 9 is a diagram illustrating another example of the output timing of the transient sounds included in the masker. FIG. 9 illustrates the frequency characteristic of the operating sound according to time change of the operating sound. The horizontal axis denotes time and the vertical axis denotes frequency. The dash line arrow indicates the timing of occurrence of the impact sound included in the operating sound. The solid one-sided arrow indicates the output timing of the transient sound included in the masker. The operating sound illustrated in FIG. 9 is an operating sound based on the same operation mode as the operating sound illustrated in FIG. 8. In FIG. 9, the output timing of the transient sound is different from the example of FIG. 8.

In the example illustrated in FIG. 9, the output timing of the transient sound is the same as the timing of occurrence of the impact sound included in the operating sound. The speaker 83 outputs the transient sound at the same timing as the timing of occurrence of the impact sound included in the operating sound of each cycle. The number of times of output of the transient sound may be the same as the number of times of occurrence of the impact sound, or may be less than the number of times of occurrence of the impact sound. For example, the speaker 83 outputs the transient sound at the same three timings as the timings of occurrence of the three impact sounds included in the operating sound of each cycle, although this may be one or two timings. Since the output timing of the transient sound is the same as the timing of occurrence of the impact sound, the transient sound can further divert the person's consciousness to the transient sound.

The speaker 83 may output all of the transient sounds in different scales when outputting the transient sounds a plurality of times. The speaker 83 may output some of the transient sounds in a scale different from the other transient sounds when outputting the transient sounds a plurality of times. The speaker 83 may output certain transient sounds of adjacent output timings in different scales when outputting the transient sounds a plurality of times. The speaker 83 may output transient sounds in one cycle in the same scale when outputting transient sounds a plurality of times, and output transient sounds in one adjacent cycle in different scales.

Figure 10:
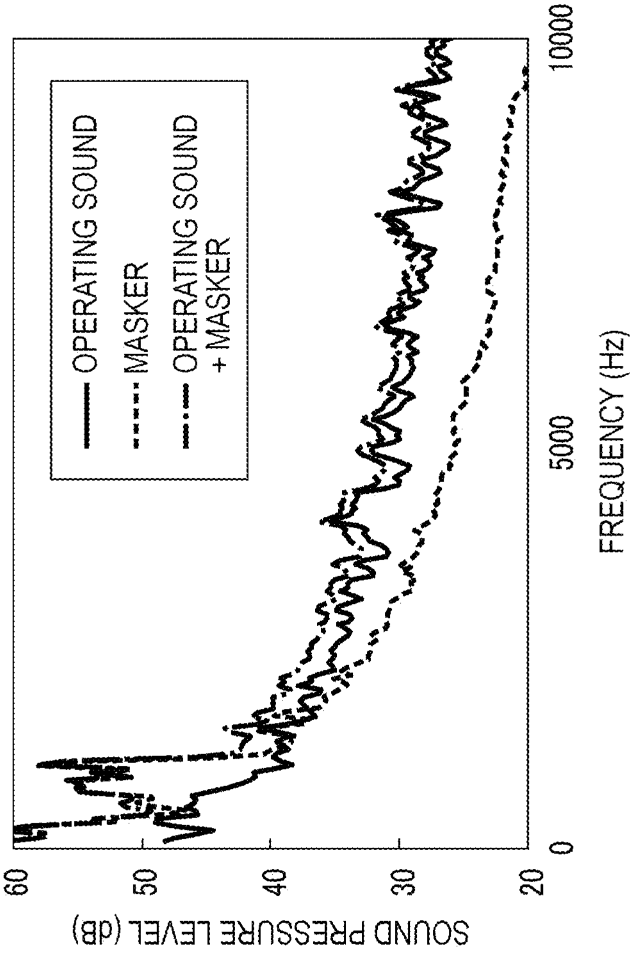
FIG. 10 is a diagram illustrating frequency characteristics of the masker and the operating sound.

FIG. 10 is a diagram illustrating the frequency characteristics of the masker and the operating sound.

FIG. 10 illustrates the frequency characteristics of the operating sound, the masker, and a sound obtained by adding the masker to the operating sound. The horizontal axis denotes the frequency, and the vertical axis denotes the sound pressure level. The solid line illustrates the frequency characteristics of the operating sound occurring in the apparatus main body 2 and the finisher 3 at the same time based on a certain operation mode. The frequency characteristic of the operating sound is the average of the operating sounds that occur for a predetermined time. The dash line indicates the frequency characteristic of the masker. The frequency characteristic of the masker is the average of the maskers output for a predetermined time. The masker includes the natural sound and the transient sound as described above. The alternate long and short dash line indicates the frequency characteristics of the sound obtained by adding the masker to the operating sound if the masker is output at the same time according to the operating sound.

The operating sound includes a large amount of motor driving sounds, fan sounds, and the like, but as can be seen from FIG. 10, the motor driving sounds, the fan sounds, and the like include a large amount of low frequency components of 2 kHz or less. The peak frequency appears below 2 kHz. The operating sound is an unpleasant sound including not only the low frequency components of 2 kHz or less, but also a large amount of high frequency components.

As can be seen from FIG. 10, the masker includes a large amount of low frequency components of 2 kHz or less due to natural sound. If the high frequency component of the masker increases, the masker is uncomfortable, but the masker in the present example is smaller than the sound pressure level of the operating sound.

As can be seen from FIG. 10, if the masker is output at the same time as the operating sound, the peak frequency sound of low frequency is masked by the natural sound included in the masker, making the operating sound hardly audible. Even if the masker is added to the operating sound, the high frequency component is almost unchanged, so that the masker is not the unpleasant sound. As a result of audibility evaluation, the transient sound included in the masker diverts the person's consciousness to the transient sound and makes the impact sound inconspicuous, thereby reducing the discomfort from the impact sound.

According to the present embodiment, the image forming apparatus 1 outputs the masker of non-stationary sound according to the operating sound of the operation unit. As a result, the image forming apparatus 1 can audibly divert the consciousness to the masker and make the operating sound of the operation unit inconspicuous.

The masker is described as including both the stationary sound such as the natural sound and the transient sound, but is not limited thereto. The masker may be the non-stationary sound, and the masker may be formed of only the transient sound and not include the stationary sound.

The acoustic output apparatus may be implemented as one device as described above by the example of the image forming apparatus 1, or as a plurality of devices having distributed functions.

The acoustic output apparatus is not limited to the image forming apparatus 1, and may be various other devices that produce the operating sound based on the operation of the operation unit. For example, the acoustic output apparatus may be a point of sales (POS) device. By outputting the same masker as described above, the POS device can make the operating sound of the change machine, the operating sound of the receipt printer, and the like inconspicuous.

Other than in the operating examples, if any, or where otherwise indicated, all numbers, values and/or expressions referring to parameters, measurements, conditions, etc., used in the specification and claims are to be understood as modified in all instances by the term "about."

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic output apparatus, comprising:

an acquisition component that acquires sound data of a non-stationary sound that masks an operating sound, in which the operating sound is based on an operation of an operation component, the non-stationary sound comprises a transient sound including a reverberation sound; and an output component that outputs the non-stationary sound based on the sound data acquired by the acquisition component during an occurrence of the operating sound.

2. The acoustic output apparatus according to claim 1, wherein the length of the reverberation sound of the transient sound is 0.2 seconds or longer.

3. The acoustic output apparatus according to claim 1, wherein the transient sound having a same cycle as a repeating cycle of the operating sound.

4. The acoustic output apparatus according to claim 1, wherein the output component outputs the transient sound before or at a same timing as a timing of an occurrence of an impact sound included in the operating sound.

5. The acoustic output apparatus according to claim 1, wherein the non-stationary sound has a non-constant sound pressure level with a passage of time.

6. The acoustic output apparatus according to claim 1, wherein the sound data comprises stationary sounds and transient sounds.

7. The acoustic output apparatus according to claim 1, wherein the operation component is an image forming apparatus.

8. An acoustic output method, comprising:

acquiring sound data of a non-stationary sound that masks an operating sound, in which the operating sound is based on an operation of an operation component, the non-stationary sound comprises a transient sound including a reverberation sound; and an output component that outputting the non-stationary sound based on the sound data acquired during an occurrence of the operating sound.

9. The acoustic output method according to claim 8, wherein the length of the reverberation sound of the transient sound is 0.2 seconds or longer.

10. The acoustic output method according to claim 9, wherein the transient sound having a same cycle as a repeating cycle of the operating sound.

11. The acoustic output method according to claim 9, further comprising:

outputting the transient sound before or at a same timing as a timing of an occurrence of an impact sound included in the operating sound.

12. An image forming apparatus, comprising:

an image forming component;

a post-processing component; and an acoustic output apparatus, comprising:

an acquisition component that acquires sound data of a non-stationary sound that masks an operating sound, in which the operating sound is based on an operation of an operation component, the non-stationary sound comprises a transient sound including a reverberation sound; and an output component that outputs the non-stationary sound based on the sound data acquired by the acquisition component during an occurrence of the operating sound.

13. The image forming apparatus according to claim 12, wherein the length of the reverberation sound of the transient sound is 0.2 seconds or longer.

14. The image forming apparatus according to claim 12, wherein the transient sound having a same cycle as a repeating cycle of the operating sound.

15. The image forming apparatus according to claim 12, wherein the output component outputs the transient sound before or at a same timing as a timing of an occurrence of an impact sound included in the operating sound.

16. The image forming apparatus according to claim 12, wherein the non-stationary sound has a non-constant sound pressure level with a passage of time.

17. The image forming apparatus according to claim 12, wherein the sound data comprises stationary sounds and transient sounds.

* * * * *